(12) United States Patent
Heinrichsdorff et al.

(10) Patent No.: US 9,718,934 B2
(45) Date of Patent: Aug. 1, 2017

(54) CELLULOSE MATERIAL HAVING IMPREGNATION AND USE OF THE CELLULOSE MATERIAL

(71) Applicant: SIEMENS AKTIENGESELLSCHAFT, München (DE)

(72) Inventors: Frank Heinrichsdorff, Teltow (DE); Volkmar Lüthen, Berlin (DE); Gabriele Winkler, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 26 days.

(21) Appl. No.: 14/780,457

(22) PCT Filed: Mar. 11, 2014

(86) PCT No.: PCT/EP2014/054690
§ 371 (c)(1),
(2) Date: Sep. 25, 2015

(87) PCT Pub. No.: WO2014/154478
PCT Pub. Date: Oct. 2, 2014

(65) Prior Publication Data
US 2016/0039985 A1    Feb. 11, 2016

(30) Foreign Application Priority Data
Mar. 28, 2013   (DE) .................. 10 2013 205 585

(51) Int. Cl.
*H01B 1/20* (2006.01)
*C08J 5/24* (2006.01)
(Continued)

(52) U.S. Cl.
CPC ................. *C08J 5/24* (2013.01); *D21H 17/45* (2013.01); *D21H 17/56* (2013.01); *H01B 1/20* (2013.01);
(Continued)

(58) Field of Classification Search
CPC ......... C08J 2379/04; C08J 5/24; D21H 17/45; D21H 17/56; H01B 1/20; H01B 3/185; H01B 3/30
See application file for complete search history.

(56) References Cited

U.S. PATENT DOCUMENTS 2,943,013 A    6/1960   Arledter
3,386,880 A    6/1968   Lomas
(Continued)

FOREIGN PATENT DOCUMENTS

DE   10 2007 018 540 A1   10/2008
DE   10 2010 041 635 A1   3/2012
(Continued)

OTHER PUBLICATIONS

Earle, M.D., "The Electrical Conductivity of Titanium Dioxide," J. Phys. Rev., 61, pp. 56-62 (1942).*
(Continued)

*Primary Examiner* — Mark Kopec
*Assistant Examiner* — Jaison Thomas
(74) *Attorney, Agent, or Firm* — Slayden Grubert Beard PLLC

(57) ABSTRACT

Cellulose fibers are impregnated with polyethyleneimine so that the impregnation forms a type of network, which can reduce the specific resistance of the cellulose material owing to the electrical conductivity of the network. The cellulose material can thereby be advantageously adapted to use as electrical insulation of transformers, the cellulose material in this case being soaked in transformer oil. An adaptation of (Continued)

the specific resistance of the cellulose material to the specific resistance of the oil lead to improved dielectric strength of the transformer insulation. A method for impregnation of the cellulose material is described.

13 Claims, 3 Drawing Sheets

(51) Int. Cl.
| | |
|---|---|
| D21H 17/45 | (2006.01) |
| D21H 17/56 | (2006.01) |
| H01B 3/18 | (2006.01) |
| H01B 3/30 | (2006.01) |

(52) U.S. Cl.
CPC ............ H01B 3/185 (2013.01); H01B 3/303 (2013.01); *C08J 2379/04* (2013.01)

(56) References Cited

U.S. PATENT DOCUMENTS

| | | | | |
|---|---|---|---|---|
| 3,574,053 | A * | 4/1971 | Hine, Jr. ............... | D06M 15/39 162/168.2 |
| 3,885,069 | A * | 5/1975 | Roberts ................... | B01J 20/22 210/679 |
| 4,521,450 | A * | 6/1985 | Bjorklund .............. | D21H 17/34 252/519.32 |
| 6,468,396 | B2 | 10/2002 | Allen et al. | |
| 2001/0047879 | A1 | 12/2001 | Lakner et al. ............. | 174/137 B |
| 2006/0142432 | A1* | 6/2006 | Harrington ......... | C08F 293/005 524/13 |
| 2008/0142762 | A1 | 6/2008 | Ni et al. | |
| 2009/0220796 | A1* | 9/2009 | Kato ...................... | H01B 1/127 428/419 |
| 2014/0224443 | A1* | 8/2014 | Jogikalmath .......... | D21H 11/00 162/146 |
| 2016/0010283 | A1* | 1/2016 | Jogikalmath .......... | D21H 11/20 162/142 |

FOREIGN PATENT DOCUMENTS

| | | | | |
|---|---|---|---|---|
| DE | 102010041630 | A1 | 3/2012 | |
| DE | 10 2011 008 462 | A1 | 7/2012 | |
| DE | 102013205585.4 | | 3/2013 | |
| EP | 1 770 803 | A1 | 4/2007 | |
| RU | 2279727 | C2 | 7/2006 | ............. H01B 12/00 |
| SU | 958567 | A1 | 9/1982 | ............. D21H 25/02 |
| WO | 98/55693 | A1 | 12/1998 | ............ C08L 101/00 |
| WO | 2006/015698 | A1 | 2/2006 | |
| WO | 2012/041714 | A1 | 4/2012 | |
| WO | 2012/093052 | A1 | 7/2012 | |
| WO | 2012/093053 | A1 | 7/2012 | ............... H01B 1/06 |
| WO | PCT/EP2014/054690 | | 3/2014 | |

OTHER PUBLICATIONS

"Ionomers", Polymer Science Learning Center, http://pslc.ws/macrog/ionomer.htm, 2003.*
Dong, Wang et al., "Study on Polyacrylonitrile Fiber / Modified by Nano-ATO Particles," Journal of Functional Polymers, No. 1, pp. 102-108 (Chinese w/ English abstract), Mar. 2004.
Chinese Office Action, Application No. 201480026810.2, 15 pages, Jul. 4, 2016.
International Search Report for PCT/EP2014/054690 mailed Jul. 3, 2014.
Office Action dated Nov. 5, 2013 in corresponding German Patent Application No. 10 2013 205 585.4.

* cited by examiner $\varepsilon_{comp} \approx 4$

⇩ $\tilde{U}$ $U_o \approx \frac{1}{2} U_p$ $U_o \approx \frac{1}{2} U_{comp}$ $\rho_{comp} \approx 10^{12} \Omega\,m$ ⇩ $\overline{U}$ $U_o \approx \frac{1}{1000} U_p$ $U_o \approx U_{comp}$

CELLULOSE MATERIAL HAVING IMPREGNATION AND USE OF THE CELLULOSE MATERIAL

CROSS REFERENCE TO RELATED APPLICATIONS

This application is the U.S. national stage of International Application No. PCT/EP2014/054690, filed Mar. 11, 2014 and claims the benefit thereof. The International Application claims the benefit of German Application No. 102013205585.4 filed on Mar. 28, 2013, both applications are incorporated by reference herein in their entirety.

BACKGROUND

Described below are a cellulose material provided with an impregnation that increases the electrical conductivity of the cellulose material and a use of this cellulose material.

U.S. Pat. No. 4,521,450 discloses that an impregnable solid material composed of cellulose fibers can be dipped into an aqueous oxidizing agent, for example a weakly acidic solution of iron(III) chloride solution, cerium(IV) sulfate, potassium hexacyanoferrate(III) or molybdophosphoric acid. Subsequently, the moist cellulose material is treated either with liquid or vaporous pyrrole compounds at room temperature until the pyrrole is polymerized, depending on the concentration of the oxidizing agent. The cellulose material thus impregnated is dried at room temperature for 24 hours. The oxidizing agent firstly ensures the polymerization of the pyrrole compounds, and also an increase in the electrical conductivity. The specific resistivity p of such impregnated cellulose materials can thus be influenced via the concentration of pyrroles and the type of oxidizing agent. In the production of the impregnated cellulose material, the toxic effect of pyrrole has to be taken into account through suitable working conditions and appropriate waste disposal.

In general, the use of electrically conductive polymers is known, for example, from DE 10 2007 018 540 A1, in order to use transparent, electrically conductive layers, for example, for the heating of automotive glass. Examples of such electrically conductive polymers are polypyrroles, polyaniline, polythiophenes, polyparaphenylenes, polyparaphenylene-vinylenes and derivatives of the polymers. A specific example of such polymers is PEDOT, which is also sold under the Baytron trade name by Bayer AG. PEDOT is also referred to by its systematic name of poly(3,4-ethylenedioxy-thiophene).

SUMMARY

Described below are a cellulose material having an impregnation that increases the electrical conductivity of this cellulose material, and permits simplified production and a use for this cellulose material.

The cellulose material cited at the outset undergoes impregnation by polyethyleneimine. Cellulose materials used may be materials of all known forms. Cellulose materials may be produced in the form of paper, paperboard or fiberboard. These cellulose materials may be semifinished products for technical components which advantageously find use in the impregnated variant.

The use of negatively charged and positively charged ionomers advantageously enables particularly simple production of the cellulose material. The ionomers can simply be dissolved in water and thus supplied to the production operation for the likewise water-based cellulose material.

Crosslinking of the ionomers after the production of the cellulose material can lower the specific resistivity of the cellulose material. In the course of this, the ionomers are polymerized and form an electrically conductive network of polyethyleneimine in the cellulose material, which is responsible for the reduction in specific resistivity. Advantageously, the production operation can be conducted with comparatively nontoxic substances, and so operational safety demands are much lower compared to the use of pyrroles. Moreover, there is no occurrence of toxic wastes, the disposal of which would mean additional expenditure.

According to an advantageous configuration, the cellulose material has also been impregnated with particles of titanium oxide. This addition of particles of titanium oxide, especially titanium dioxide, advantageously improves the aging resistance of the insulation materials. According to a particular configuration, the polyethyleneimine has been appended to the particles of titanium oxide. This advantageously achieves reliable fixing of these particles in the assembly of the cellulose material formed of the cellulose fibers. Moreover, it is advantageously also possible to further increase the electrical conductivity of the cellulose material.

According to an advantageous configuration, the specific resistivity $\rho_p$ of the impregnated cellulose material is $10^{12}$ $\Omega m$. This has the advantage, for example, in the case of use of the cellulose material in the oil of a transformer, that the specific resistivity of the cellulose material is of an order of magnitude comparable to that of the oil, for which reason dielectric stress in operation is distributed homogeneously between the transformer oil and the insulation material. Therefore, the cellulose material having an impregnation that increases the electrical conductivity of the cellulose material by using polyethyleneimine may be used as insulation material for a transformer.

It will be appreciated that the insulation material can be used not just for a transformer but also for other electrical components. In this context, any desired system components in high-voltage technology under DC current stress can reliably be electrically insulated. The insulation material can be used here as shell or else as coating of the system components.

Coating can be effected in such a way that the cellulose material is placed onto the component, for example, in the form of a mat and then impregnated with the polyethyleneimine. By heating the impregnated cellulose web, the ionomers used are then polymerized to give polyethyleneimine.

The cellulose material may be flat and have an at least essentially constant concentration of the polymer intended for impregnation over the entire thickness. This can achieve the effect that the specific resistivity, especially in the case of use of the cellulose material as electrical insulation in oil, generates a homogeneous voltage drop over the entire cross section of the insulation (more to follow with regard to the conditions that exist in the electrical insulation in transformers).

The cellulose material can be produced by a method in which impregnation with organic substances is effected in the steps which follow. First of all, an aqueous electrolyte is produced from a positively charged ionomer and a negatively charged ionomer. Cellulose fibers are added to this electrolyte. This gives rise to a pulp, the starting material for production of paper which is created from the pulp. Alternatively, the cellulose fibers can also be impregnated with the electrolyte. This requires a raw material with cellulose fibers to be already present, such as in dry form or in the dewatered state, such that the electrolyte can be supplied to this intermediate. In the next step, the water in the electrolyte is removed at least to such an extent as to form the cellulose material. This means that the cellulose material already forms an assembly that can be handled and can form the basis for a further processing operation. This is effected by dewatering, for example, as known from papermaking, by draining the pulp on a screen. Finally, the ionomers are crosslinked to give polyethyleneimine. For this purpose, a heat treatment may be required above the crosslinking temperature of the ionomers in question. This results in the formation of the network of polymers already mentioned above, which is electrically conductive, and therefore lowers the specific resistivity of the cellulose material.

In order to be able to produce cellulose materials of greater thickness, it is advantageously possible that the cellulose material is produced by layering several previously impregnated plies. This can ensure that the individual plies of cellulose material are sufficiently thin that impregnation is enabled at least substantially over the entire thickness of the ply. This is also possible when the plies produced are impregnated by the electrolyte in the manner described above and there is no impregnation of the individual cellulose fibers. In order subsequently to be able to arrive at a cellulose material of greater thickness, this is layered after the treatment with the electrolyte to form a multi-ply cellulose material. In this case, crosslinking and/or drying can be commenced even before the layering of the plies. However, it is advantageous to complete the crosslinking only after the layering of the plies, since crosslinking of ionomers in different plies with one another can then also be effected, so as to give rise to the already described network of polymers across all the plies. In this way, it is possible to increase the specific resistivity even of a multi-ply cellulose material in an advantageous manner with comparatively little polymer material to a comparatively high degree.

The cellulose material, in one working example, can be produced under laboratory conditions, the process sequence being as elucidated in detail hereinafter. It is possible to use a commercially available fiberboard (called cellulose as supplied hereinafter). This is first cut into pieces of size 90×50 mm with a thickness of 3.1 mm. These are heated in distilled water at temperatures between 95 and 99° C. while stirring by a magnetic stirrer until the individual plies begin to come apart in the edge region of the fiberboard. At this stage, the fiberboard is then completely saturated with water. The wet fiberboard is removed from the water and separated into its individual plies. The separated plies are heated again in distilled water at 95-99° C. while stirring until further individual sheets become detached. The individual plies and sheets are removed again from the water and individualized down to the thinnest separable layer. The very thin layers that are not separable mechanically are finally heated in distilled water (for temperatures see above) while stirring until individual cellulose fibers are present.

Next, the pulp thus obtained is filtered to give thin tissue plies. The individual cellulose filaments are filtered off, specifically with the aid of a Büchner funnel with application of reduced pressure. The filter paper used may be a Schleicher & Schöll No. 589 or 595 black-band filter. The tissue plies thus obtained still contain several times the original weight of the fiberboard used of water. The tissue plies are easily separable from the black-band filter.

Thereafter, the individual tissue plies in an aqueous solution are dissolved into individual cellulose filaments at room temperature while stirring with a magnetic stirrer. These cellulose filaments are impregnated during the stirring operation with ionomers of polyethyleneimine. After stirring for one hour, the impregnated cellulose filaments are filtered off on a black-band filter under reduced pressure by the principle already described. The resultant tissue ply can again be detached easily from the black-band filter.

In a following operation, the impregnated tissue plies should be smoothed by rolling. For this purpose, the individual tissue plies are placed one on top of another and pressed gently against one another with a flat article.

Subsequently, the stack of impregnated tissue plies is compressed repeatedly with rising pressure by a roller. This compresses the individual tissue plies to give an impregnated fiber felt, with expression of excess liquid.

Next, the ionomers should be crosslinked and the cellulose material should be dried. For this purpose, the remaining water is removed by evaporation in a drying cabinet between steel plates under pressure. The temperature for drying is chosen such that crosslinking of the polyethyleneimine takes place first of all. For this purpose, the impregnated fiber felt is placed between steel plates. The steel plates are pressed together, for example, with a pressure of 2.4 kPa. The contact surfaces with which the impregnated fiber felt came into contact may be coated with Teflon in order to prevent caking of the as yet unpolymerized starting materials onto the metal plates. As soon as the crosslinking is complete, for the final drying, contact surfaces made of metal are used. The final drying is effected until there is no further change in the weight and thickness of the cellulose material.

By impregnation of the cellulose material with polyethyleneimine, it is possible to control the electrical properties, such that the specific resistivity of the cellulose material can be altered. The apparatus complexity can be kept comparatively low because the polymers used are not a matter of toxic concern as compared with the use of pyrrole compounds.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
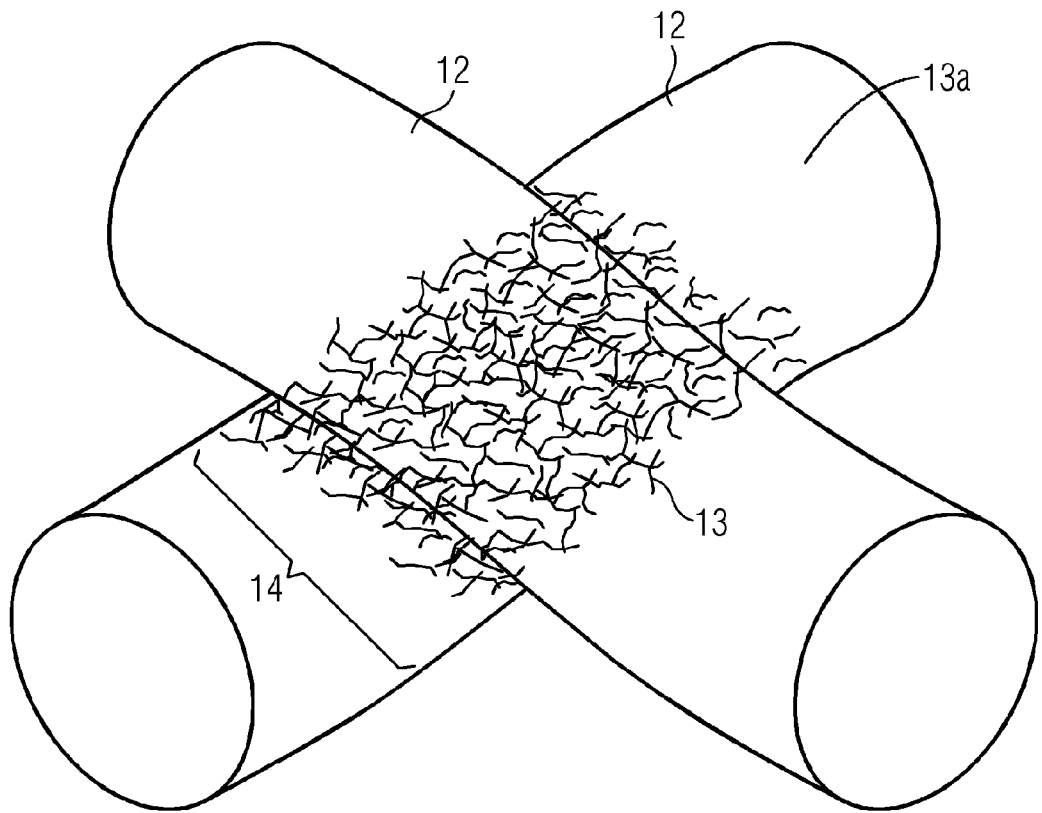
FIG. 1 is a perspective view of cellulose fibers surrounded by a network of polymers (or else alternatively with particles of titanium oxide), according to one working example of the cellulose material.

Reference will now be made in detail to the preferred embodiments, examples of which are illustrated in the accompanying drawings, wherein like reference numerals refer to like elements throughout.

According to FIG. 1, a cellulose material is represented by two cellulose fibers 12, in which polyethyleneimine 13 forms a network 14, of which a section is shown. This network 14 is obtained by conducting a polymerization of the polymer only after impregnation of the cellulose fibers 12 and production of the cellulose material. The network 14 permeates the cellulose material, so as to assure an electrically conductive connection of the electrically conductive polymer. Therefore, the network 14 in the polyethyleneimine 13 reduces the specific resistivity of the cellulose material in the manner described above.

In addition, FIG. 1 shows, in schematic form, particles 13*a* of titanium oxide held within the tissue formed by the cellulose fibers 12. The cellulose fibers 12 result in interstices in which the particles 13*a* can be fixed. An additional fixing effect is also brought about by the polyethyleneimine 13 which also covers the surface of the particles 13*a* and thus brings about a mechanically stabilizing effect in the region of these particles 13*a*.

Figure 2:
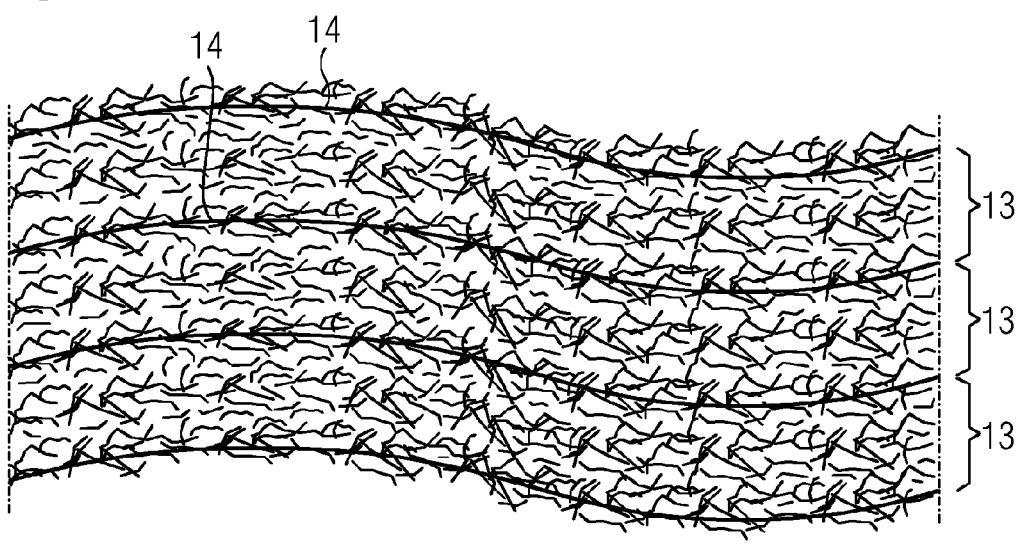
FIG. 2 is a schematic section through a multi-ply cellulose material according to another working example of the cellulose material.

In FIG. 2, it is apparent that a cellulose material may also be formed from several plies 13. In this case, the plies have been impregnated only after they have been produced. It is therefore apparent that the network 14 of the polymers is present in each case only in the vicinity of the surface of the plies 13, because the electrolyte with which the plies 13 have been impregnated has penetrated only into the surface of the individual plies. However, polymerization of the polymer has only occurred once the plies 13 have already been joined to form the cellulose material, and so the networks that form extend across the plies and thus contribute firstly to better cohesion of the cellulose material and secondly to a decrease in the specific resistivity of the cellulose material.

Figures 3A, 3B, 3C:
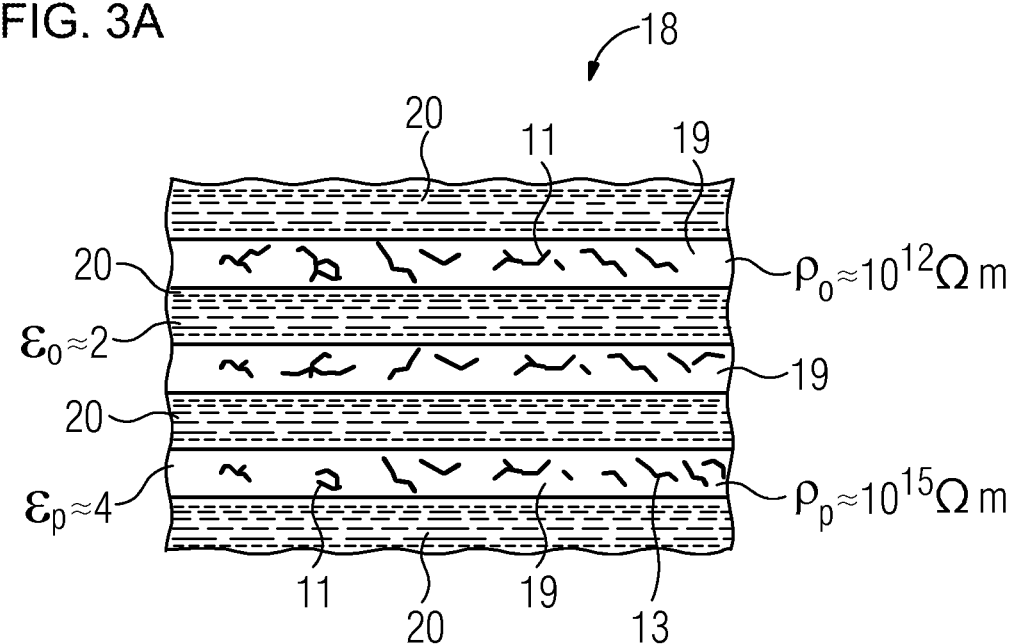
FIG. 3A is a section of a working example of the cellulose material, as used as insulation in a transformer.
FIGS. 3B and 3C are schematic illustrations of the voltages across the insulation material illustrated in FIG. 3A.

An electrical insulation material 18 according to FIG. 3A has several plies of paper 19 as cellulose material with oil layers 20 therebetween. The papers 19 have also been impregnated with oil, which is not shown specifically in FIG. 3A. What FIG. 3A does show is the impregnation with polyethyleneimine 13 between the papers. The insulation shown in FIG. 3A surrounds, for example, the windings used in a transformer, which have to be electrically insulated from the outside and from one another.

The electrical insulation of a transformer, in the case of operation, has to prevent electrical breakdowns on application of an AC voltage. In this case, the insulation characteristics of the insulation are dependent on the permittivity of the components of the insulation. For oil the permittivity figure $\epsilon_o$ is about 2, and that for paper $\epsilon_p$ is 4. When the insulation is subjected to AC voltage stress, therefore, with respect to the stress on the individual insulation components, the voltage $U_o$ across the oil is about twice as high as the voltage $U_p$ across the paper. If the nanocomposite in which the paper 19 has been impregnated with polyethyleneimine in the manner shown in FIG. 3A is used, the polyethyleneimine does not affect the voltage distribution in the insulation, since the permittivity figure of the polyethyleneimine is likewise roughly within this order of magnitude and therefore the permittivity $\epsilon_{comp}$ of the impregnated paper is also roughly 4. Thus, in the insulation, the voltage $U_o$ across the oil is also roughly twice as high as the voltage $U_{comp}$ across the nanocomposite (paper).

If faults occur in the transformer, the dielectric strength of the insulation may also be important in the presence of DC voltages. In that case, however, distribution of the voltage present between the individual insulation constituents is dependent not on the permittivity but on the specific resistivity of the individual components. The specific resistivity $\rho_o$ of oil is $10^{12}$ Ωm. In contrast, $\rho_p$ of paper is three orders of magnitude higher and is $10^{15}$ Ωm. The effect of this is that, in the presence of a DC voltage, the voltage across the oil $U_o$ is one thousand times the voltage across the paper $U_p$. In the case that the insulation is subjected to a DC voltage, this imbalance harbors the risk of breakdown in the oil and of failure of the electrical insulation.

The network of polyethyleneimine introduced into the paper 19 may be adjusted via choice of the concentration of polyethyleneimine (between 0.1 and 1000 Ωcm) in such a way that the specific resistivity of the paper $\rho_p$ is lowered. This allows establishment of a specific conductivity $\rho_{comp}$ for the composite which approaches the specific resistivity $\rho_o$ and in the ideal case corresponds roughly thereto. In the case of a specific resistivity $\rho_{comp}$ of roughly $10^{12}$ Ωm, the voltage $U_o$ across the oil is in the region of the voltage $U_{comp}$ across the composite, so as to establish a balanced voltage profile in the insulation.

This advantageously improves the dielectric strength of the insulation, since the stress on the oil is perceptibly reduced.

These considerations can also be made analogously for other devices operated with DC current or components thereof. The required specific resistivity can be adjusted via the density of the network formed by the polyethyleneimine. In this way, it is especially possible to adjust the electrical properties of electrical insulation components to the particular application.

Figure 4:
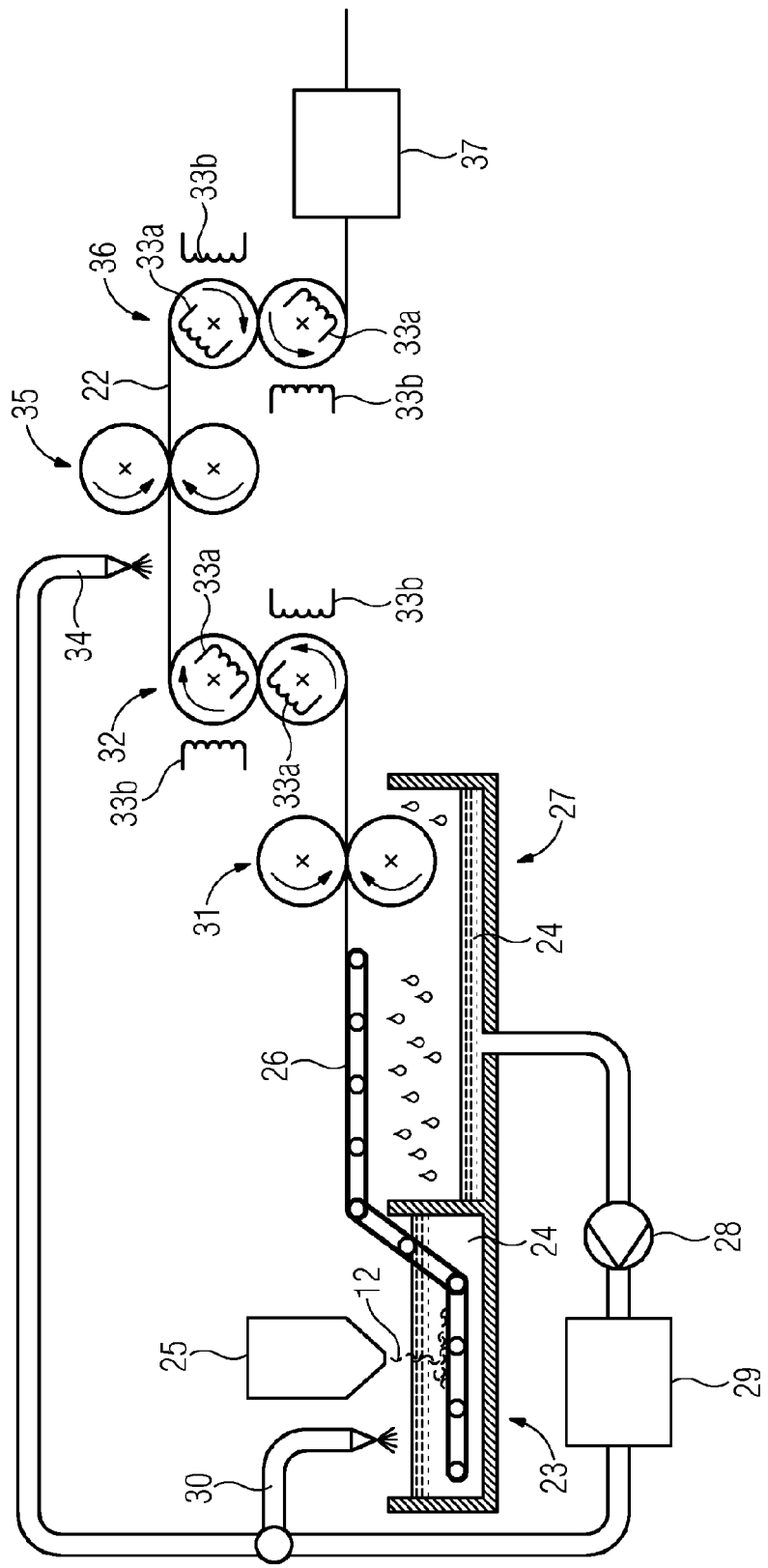
FIG. 4 is schematic side view of a working example of a manufacturing plant.

FIG. 4 shows a manufacturing plant for a cellulose material in the form of a paper web 22 suitable for conducting a working example of the method. This plant has a first vessel 23 for an electrolyte 24, with ionomers of polyethyleneimine present in the electrolyte. In addition, cellulose fibers 12 or a mixture of cellulose fibers 12 and nanoparticles of titanium oxide (not shown) are trickled into the electrolyte 24 from a reservoir vessel 25. In this way, in a manner which is known per se and therefore not shown in detail, a pulp is produced in the electrolyte 24, which is separated out on a conveyor belt 26 in the form of a sieve. This conveyor belt leads into a second vessel 27 where the electrolyte 24 can drip off, resulting in formation of an already partly dewatered mat from the cellulose fibers. The electrolyte is fed by a pump 28 to a reprocessing system 29, where the required concentration of the ionomers is reestablished. The processed electrolyte can be fed to the first vessel 23 via a feed 30.

At a later stage in the process, the paper web 22 is produced from the cellulose material obtained. First of all, there is a further dewatering operation by a roller pair 31, with collection of the electrolyte released in this dewatering in the vessel 27. Subsequently, the paper web 22 passes through a next roller pair 32, with achievement of a comparatively high entwinement angle through the S-shaped guiding of the paper web around the roller pair. This is because the roller pair is heated by the heating devices 33*a* indicated, such that heat transfer to the paper web is possible. For this purpose, additional heating devices 33*b* may also be used in support. The heating devices 33*a*, 33*b* bring the paper web to the polymerization temperature, such that the ionomers polymerize to give polyethyleneimine and the network already described above forms. In the course of this treatment, there is also further dewatering.

After polymerizing the ionomers, electrolyte can be applied to the paper web once again by a further feed apparatus 34, the now substantially dewatered paper web being absorptive enough for electrolyte impregnation of the cellulose fibers to be possible. Subsequently, the paper web 22 passes through a further roller pair 35 and is dewatered again as a result. A further dewatering and polymerization of the additionally introduced ionomers is achieved by a roller pair 36, the latter being heatable in the manner described for the roller pair 32 by heating devices 33a, 33b.

As soon as the paper web 22 leaves the roller pair 36, the paper web has been substantially dewatered. However, it still contains a residual water content and is consequently fed to a drying unit 37 and can be dried if required in this drying unit.

In this regard, it should be noted that the specific resistivity p of the paper web 22 produced is dependent not just on the content of polyethyleneimine but also on the residual water content. If the paper web is to be used, for example, as electrical insulation in a transformer, it has to be impregnated with oil and consequently must contain an absolute minimum level of water. This can be ensured through the subsequent drying in the drying unit 37. The drying unit 37 may be configured, for example, as an oven.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A cellulose material, comprising:
   multiple stacked plies, each ply comprising cellulose fibers with an impregnation of polyethyleneimine,
   ionomers of the polyethyleneimine impregnation in each ply cross-linked in polymerized form to adjacent plies, and
   the cellulose material having an electrical conductivity in a same order of magnitude as transformer oil.

2. The cellulose material as claimed in claim 1, wherein the cellulose fibers are also impregnated with particles of titanium oxide.

3. The cellulose material as claimed in claim 2, wherein the polyethyleneimine is appended to the particles of titanium oxide.

4. The cellulose material as claimed in claim 3, wherein the cellulose material has a specific resistivity of $10^{12}$ Ωm.

5. The cellulose material as claimed in claim 4, wherein the cellulose material is flat and has a uniform concentration of the polyethyleneimine throughout.

6. The cellulose material as claimed in claim 3, wherein the cellulose material is flat and has a uniform concentration of the polyethyleneimine throughout.

7. The cellulose material as claimed in claim 2, wherein the cellulose material has a specific resistivity of $10^{12}$ Ωm.

8. The cellulose material as claimed in claim 7, wherein the cellulose material is flat and has a uniform concentration of the polyethyleneimine throughout.

9. The cellulose material as claimed in claim 2, wherein the cellulose material is flat and has a uniform concentration of the polyethyleneimine throughout.

10. The cellulose material as claimed in claim 1, wherein the cellulose material has a specific resistivity of $10^{12}$ Ωm.

11. The cellulose material as claimed in claim 10, wherein the cellulose material is flat and has a uniform concentration of the polyethyleneimine throughout.

12. The cellulose material as claimed in claim 1, wherein the cellulose material is flat and has a uniform concentration of the polyethyleneimine throughout.

13. Insulation for a transformer containing transformer oil, comprising:
    multiple stacked plies, each ply comprising cellulose fibers impregnated with polyethyleneimine,
    ionomers of the polyethyleneimine impregnation in each ply cross-linked in polymerized form to adjacent plies, and
    the insulation having an electrical conductivity in a same order of magnitude as the transformer oil in the transformer.

* * * * *